United States Patent
Hochstein

[11] Patent Number: 6,049,069
[45] Date of Patent: Apr. 11, 2000

[54] WINDOW FOG DETECTOR

[75] Inventor: Peter A. Hochstein, Troy, Mich.

[73] Assignee: Valeo Electrical Systems, Inc., Auburn Hills, Mich.

[21] Appl. No.: 09/318,315

[22] Filed: May 25, 1999

[51] Int. Cl.$^7$ .................................................. H05B 1/02
[52] U.S. Cl. .......................... 219/497; 219/502; 219/203; 219/494; 219/214; 340/604; 340/602; 250/227.25
[58] Field of Search ..................................... 219/209, 210, 219/202, 203, 497, 502, 494, 501, 214; 340/302–605; 250/227.25; 73/40; 324/755, 760

[56] References Cited

U.S. PATENT DOCUMENTS

| | | | |
|---|---|---|---|
| 4,224,565 | 9/1980 | Sosniak et al. | 338/35 |
| 4,701,052 | 10/1987 | Schoen, Jr. | 356/369 |
| 5,804,817 | 9/1998 | Seiler et al. | 250/227.25 |

*Primary Examiner*—Mark Paschall
*Attorney, Agent, or Firm*—Howard & Howard

[57] ABSTRACT

A vehicle (10) includes a windshield presenting an inner surface (14) including a test section (16) therein. A cooling device (24) is attached to the inner surface (14) for cooling the section (16) to a temperature a few degrees below the temperature of the inner surface (14) adjacent the test section (16). A sensor (26) is disposed adjacent the inner surface (14) for sensing condensation on the test section (16) and for providing a heating signal to a defogging control (28) in response to condensation on the test section (16) for initiating the heating of the surface surrounding the test section (16) by the vehicle heater (18) to prevent condensation from forming on the surface surrounding the test section (16).

12 Claims, 2 Drawing Sheets

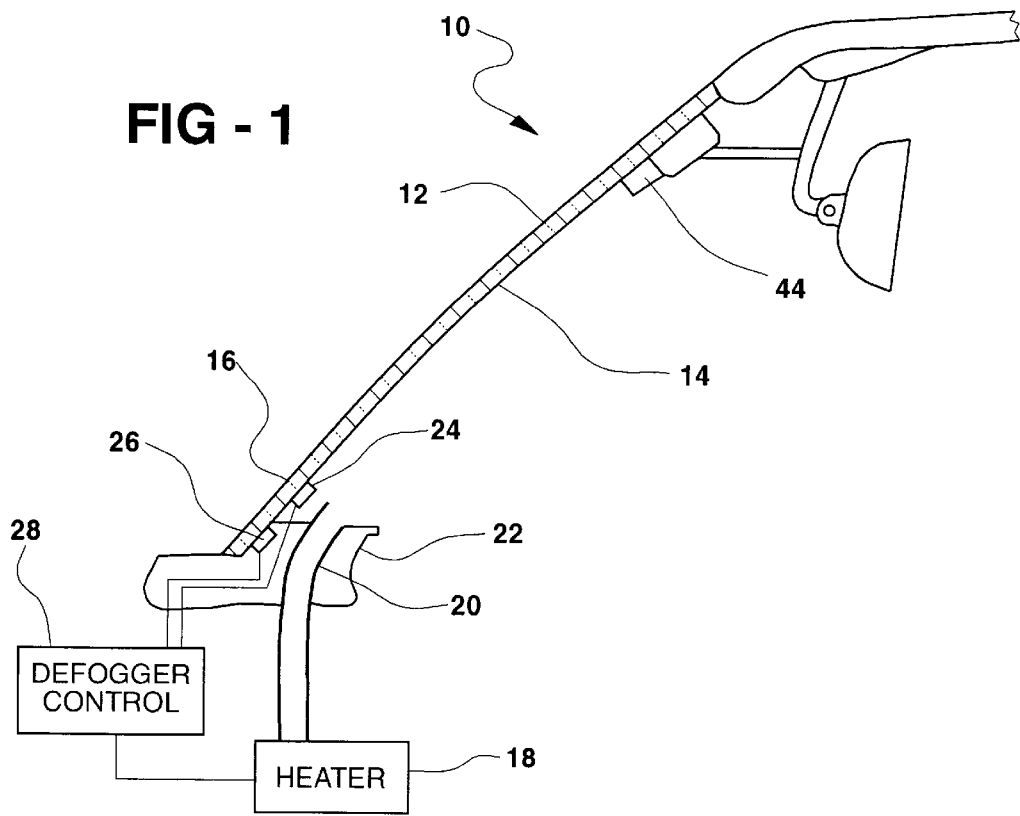
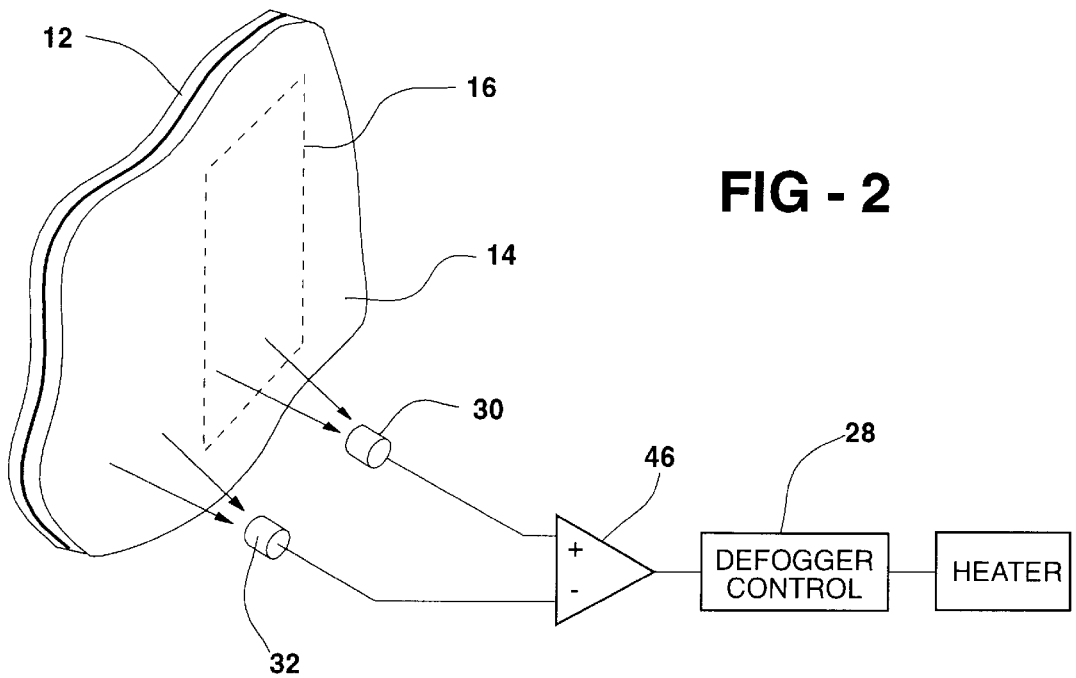

WINDOW FOG DETECTOR

BACKGROUND OF THE INVENTION

1. Field of the Invention

The present invention relates to a method and apparatus for the detection of incipient fog on surfaces of various types. This invention is particularly useful for detecting incipient fog on windows or windshields of vehicles.

2. Description of the Prior Art

The personal experience of many drivers suggests that under certain conditions sudden fogging of the interior of the windshield can constitute a critical safety hazard. Such "white out" conditions are created when moist ambient air is allowed to contact the windshield surface which is at a temperature either at or below the dew point for the existing relative humidity. Naturally, if the development of dense fog is particularly sudden, the driver's vision may be severely impaired, endangering both the driver and other motorists.

Several fog detection systems have been tested and deployed in the past, but these approaches all suffer from the same disadvantage. These prior art approaches develop a fog presence signal only after fog has begun to form on the monitored surface. However, under certain conditions, dense fog can form very suddenly and the only means to clear the obscuring fog may be too slow to provide the driver with unimpaired vision at all times. This fogging problem is particularly dangerous when driving into the sun which may be at a low elevation. A low sun angle, coupled with optical scattering or diffusion from fog on the inside surface of the windshield can temporality blind the driver and put many people at risk.

Traditional defogging systems rely on either air blown at or over the fogged surface, or electric heating of the glass surface to dissipate the fog. In most vehicular applications the standard defogger for the windshield is an electric blower designed to blow warm air on the glass that is within the driver's field of view. Embedded or surface heating elements are commonly used for rear glass surfaces to accomplish defogging or de-icing. Regulatory considerations restrict the use of such electric heating grids to the rear glass, and reduce the available options for windshield defogging to either blown air or transparent electric heating films, which are very expensive and relatively fragile.

A well known problem with a blower defogger is that it is not fast acting, and they are even less efficient if warm air is not available to accelerate the removal of the condensate, i.e., fog. Such a situation is common on first startup, when the engine is cold and the heater core is not able to add the necessary heat to the defogger air stream. In fact, under some situations operating the blower can exacerbate the situation by blowing moisture laden air onto the windshield inner surface, which may be far below the dew point in temperature.

This blower induced fogging is not as common now as it once was because automotive vehicle manufacturers now partly dry the air that is blown across the windshield. Such drying is accomplished by operating the air conditioning compressor whenever the defogger is engaged. Passing ambient air over the substantially cooled evaporator coil of the A/C system "pre-condenses" much of the humidity, thereby preventing its deposition on the moderately cool glass surface. After the air has been dehumidified, it is often passed through a heat exchanger in order to improve defogging efficacy.

In essence, the problem in achieving efficient defogging in an automotive environment is the delay in activating the defogging means. That is, once fog is detected there is an essentially unavoidable delay in clearing the glass. Increasing the air flow rate over the glass and/or adding more heat to the air stream is only partly feasible because of space and power limitations. A more practical and desirable approach to the problem would be to use a predictive fog sensing method wherein the conditions leading to fog formation would be monitored and evaluated by an intelligent controller which could begin the defogging process before the onset of actual, observable fog. Such a preemptive defogging system would, in fact not be a defogger at all because with proper inputs and controls fog could never actually form. The necessity for a rapid response to air and glass temperature in addition to accurate monitoring of relative humidity makes such an approach technically difficult. Implementing such a predictive system would be difficult in an automotive setting where environmental changes are rapid and occur over a very wide temperature range.

SUMMARY OF THE INVENTION AND ADVANTAGES

The invention provides an assembly for preventing the formation of condensation on a surface. The assembly comprises a cooling device 24 for cooling a test section 16 of the surface to a temperature below the temperature of the surface surrounding the test section 16, and a sensor 26 for sensing condensation on the test section 16 and for providing a signal in response to condensation on the test section 16 for heating the surface surrounding the test section 16 to prevent condensation from forming on the surface surrounding the test section 16.

Accordingly, the invention includes a method of preventing the formation of condensation on a surface by cooling a test section 16 of the surface to a temperature below the temperature of the surface surrounding the test section 16, sensing condensation on the test section 16, and providing a signal in response to condensation on the test section 16 for heating the surface surrounding the test section 16 to prevent condensation from forming on the surface surrounding the test section 16.

The present invention describes a novel approach to an incipient fog sensor and control system which does not require the accurate monitoring of environmental variables. The invention is unique and uncomplicated for preventing fog from suddenly appearing on the windshield of an automotive vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic view of an automotive vehicle incorporating the subject invention;

FIG. 2 is a schematic view showing a first embodiment of the invention;

DETAILED DESCRIPTION OF THE PREFERRED EMBODIMENT

Figure 3:
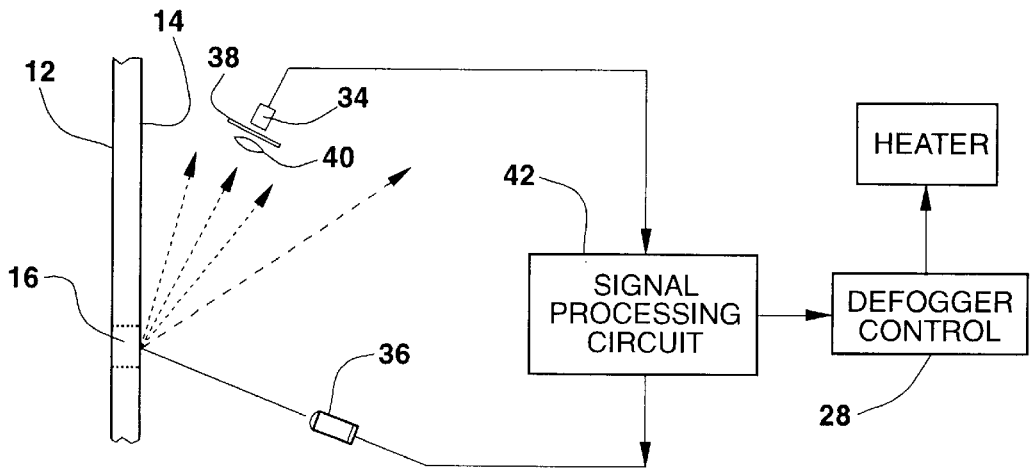
FIG. 3 is a schematic view showing a second embodiment of the invention.

Referring to the Figures, wherein like numerals indicate like or corresponding parts throughout the several views, a vehicle is generally shown at 10 in FIG. 1. The vehicle 10 comprises a window 12, specifically a windshield, presenting an inner surface 14 including a test section 16 therein adjacent the remainder of the inner surface 14.

As is well known, the vehicle includes a heater 18 for heating the inner surface 14 by forcing heated air through a defroster and/or heater duct 20 which extends through the instrument panel 22.

Figure 4:
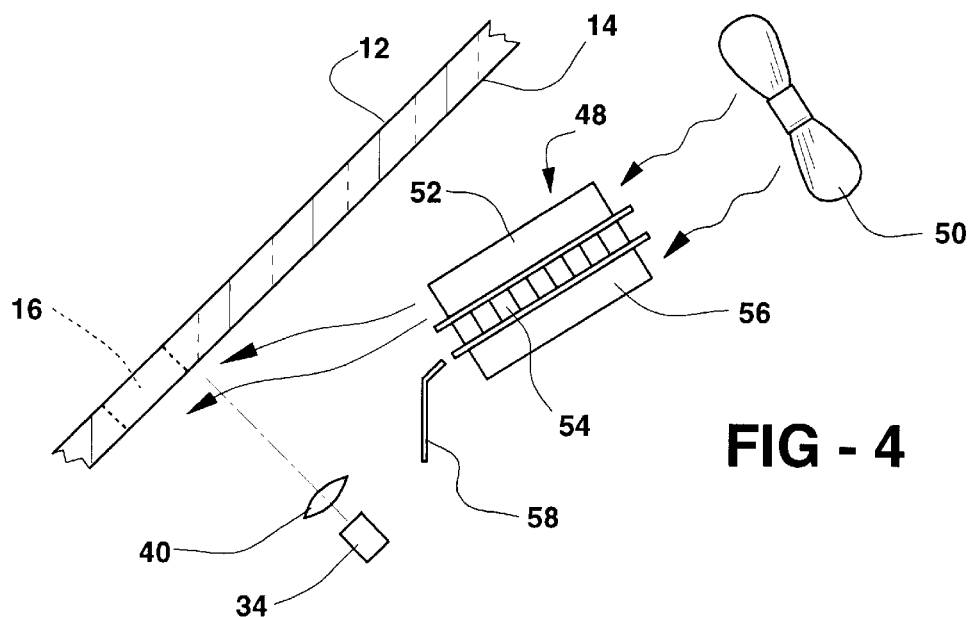
FIG. 4 is a schematic view of a device for cooling the test section of the window.
Figure 5:
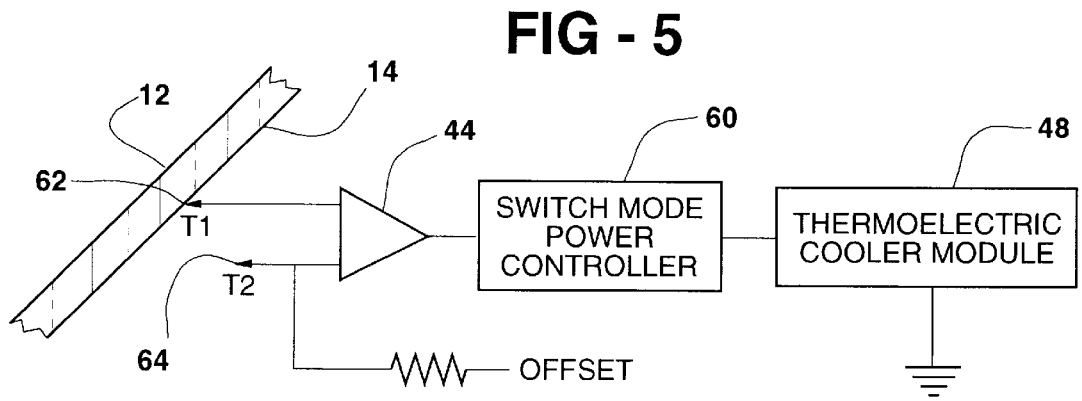
FIG. 5 is a schematic view of a device for sensing the temperatures.

A cooling device 24 is attached to or supported near the inner surface 14 for cooling the section 16 to a temperature a few degrees below the temperature of the inner surface 14 adjacent the test section 16. Examples of such cooling devices 24 are shown in FIGS. 4 and 5.

A sensor 26 is disposed adjacent the inner surface 14 for sensing condensation on the test section 16 and for providing a heating signal in response to condensation on the test section 16 for initiating the heating of the surface surrounding the test section 16 to prevent condensation from forming on the surface surrounding the test section 16. More specifically, the heating signal is sent to the defogger control 28 which controls the cooling at the cooling device 24, the sensing at the sensor 26 and the operation of the heater 18. The defogger control 28 may be incorporated into the on board computer.

As noted above, the conditions that lead to fog, i.e., condensate, formation on the inner surface 14 of automotive windshields are well known, and are related to the temperature and humidity of the air in contact with the inner surface 14 of the glass and the glass surface temperature. Whenever the glass surface is below the dew point for the instant relative humidity, moisture will condense onto the cool glass surface, forming fog. Rather than accurately monitoring all the variables necessary to predict the incipient formation of fog on the windshield (or any other surface), the present invention relies on selectively cooling a representative or test section 16 of the glass 12 to a temperature a few degrees cooler than the surrounding glass area. In principle, the mechanism employed by the instant invention is that water will condense on the coolest surface first, thereby providing an early warning signal for the defogger control 28 to activate the heater 18, i.e., the defogging system. That is, a sample surface or test section 16, representative of the entire glass surface 14, but much smaller in area, is maintained at a temperature lower than the entire surface 14, and that sample surface or test section 16 is monitored for the formation of first condensation or fog. This test method is related to the "mirror" dew point measurement technique wherein a cooled mirror is used to accurately determine the actual dew point.

Several systems may be used to perform the function of the sensor 26 to detect the formation of fog or condensation on the cooled sample surface or test section 16. The embodiment of FIG. 2 discloses a dual channel, differential, reflection photometer where a first photo detector 30 monitors the sample surface or test section 16 and a second photo detector 32 monitors the surface 14 surrounding the test section 16. Any condensate fog that would form on the cooled test section 16 would scatter and reflect more illumination energy back to the corresponding detector 30, compared to the energy reflected back from the uncooled section 14 of the glass 12 which would not have any condensate fog present initially. Of course, if there is no intervention by a defogging mechanism, i.e., the heater 18 fog may also form on the uncooled surface 14 after a given period of time. A dual channel, differential system as shown in FIG. 2 compensates for ambient light interference, temperature effects and changes in the illumination source.

As shown in FIG. 3, a simpler incipient fog sensor could be configured with a single photo sensor 34 where predetermined diffuse reflection levels could be used to trigger the defogger control 28. The use of a pulsed infrared LED 36 as the illumination light source would provide significant sunlight immunity for either the dual channel or single channel configuration. The photo detector 34 would view through a filter 38 and an optical lens 40. The signal processing circuit 42 could include an ambient light suppression function, reference and comparator functions, a synchronous detection function, andl/or a detector and oscillator, and an LED driver. Accordingly, the sensor 26 may include a photo detector for sensing light from condensation on the test section 16.

The assembly 10 also includes a thermo-sensor 44 for sensing the temperature of the surface 14 surrounding the test section 16 and cooling the test section 16 to a temperature at least one degree below the temperature of the surface surrounding the test section 16. The first photo detector 30 senses light from the test section 16 to provide a test signal and the second photo detector 32 senses light from the surface 14 adjacent the test section 16 to provide an actual signal, and a comparator 46 provides the heating signal in response to a predetermined differentiation between the test and actual signals for initiating the heater 18 to heat the inner surface 14.

The test section 16 may be cooled by the thermoelectric cooler module, generally shown at 48 in FIG. 4. The cooler module 48 includes a fan 50 for driving ambient air through the cool side 52 and onto the test section 16. A heat sink 56 extracts heat from the heated side of the module 48 and a deflector 58 directs warm air away from the test section 16. As shown in FIG. 5, a switch mode controller 60 controls the operation of the cooler module 48 in response to the temperature of the window. More specifically, a first temperature sensor 62 sensing the temperature of the test section 16 while a second temperature sensor senses the temperature of the ambient air. Of course, a wide variety of devices may be utilized for cooling the test section and sensing the temperatures.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein that which is prior art is antecedent to the characterized novelty and reference numerals are merely for convenience and are not to be in any way limiting, the invention may be practiced otherwise than as specifically described.

What is claimed is:

1. A method of preventing the formation of condensation on a surface, said method comprising the steps of;

cooling a test section (16) of the surface to a temperature below the temperature of the surface surrounding the test section (16), sensing condensation on the test section (16), and providing a signal in response to condensation on the test section (16) for heating the surface surrounding the test section (16) to prevent condensation from forming on the surface surrounding the test section (16).

2. A method of preventing the formation of condensation on a surface of a window (12) in a vehicle, said method comprising the steps of;

cooling a test section (16) of the inner surface (14) of the window (12) to a temperature a few degrees below the temperature of the inner surface (14) surrounding the test section (16), sensing condensation on the test section (16), and providing a signal in response to condensation on the test section (16) for initiating the heating of the surface surrounding the test section (16) to prevent condensation from forming on the surface surrounding the test section (16).

3. A method as set forth in claim 2 including heating the surface surrounding the test section (16) in response to the signal.

4. A method as set forth in claim 2 including sensing the temperature of the surface surrounding the test section (16) and cooling the test section (16) to a temperature at least one degree below the temperature of the surface surrounding the test section (16).

5. An assembly for preventing the formation of condensation on a surface comprising;

a cooling device (24) for cooling a test section (16) of the surface to a temperature below the temperature of the surface surrounding the test section (16), and a sensor (26) for sensing condensation on the test section (16) and for providing a signal in response to condensation on the test section (16) for heating the surface surrounding the test section (16) to prevent condensation from forming on the surface surrounding the test section (16).

6. An assembly as set forth in claim 5 including a thermo-sensor (44) for sensing the temperature of the surface surrounding the test section (16) and cooling the test section (16) to a temperature at least one degree below the temperature of the surface surrounding the test section (16).

7. An assembly for preventing the formation of condensation on a surface of a window (12) in a vehicle comprising;

a cooling device (24) for cooling a test section (16) of the inner surface (14) of the window (12) to a temperature a few degrees below the temperature of the inner surface (14) surrounding the test section (16), and a sensor (26) for sensing condensation on the test section (16) and for providing a signal in response to condensation on the test section (16) for initiating the heating of the surface surrounding the test section (16) to prevent condensation from forming on the surface surrounding the test section (16).

8. An assembly as set forth in claim 7 including a thermo-sensor (44) for sensing the temperature of the surface surrounding the test section (16) and cooling the test section (16) to a temperature at least one degree below the temperature of the surface surrounding the test section (16).

9. A vehicle comprising;

a window (12) presenting an inner surface (14) including a test section (16) therein adjacent the remainder of said inner surface (14), a heater (18) for heating said inner surface (14), a cooling device (24) for cooling said test section (16) to a temperature a few degrees below the temperature of said inner surface (14) adjacent said test section (16), and a sensor (26) for sensing condensation on said test section (16) and for providing a heating signal in response to condensation on said test section (16) for initiating the heating of said surface surrounding said test section (16) to prevent condensation from forming on said surface surrounding said test section (16).

10. An assembly as set forth in claim 9 including a thermo-sensor (44) for sensing the temperature of the surface surrounding the test section (16) and cooling the test section (16) to a temperature at least one degree below the temperature of the surface surrounding the test section (16).

11. An assembly as set forth in claim 9 wherein said sensor (26) includes a photo detector for sensing light from condensation on said test section (16).

12. An assembly as set forth in claim 9 wherein said sensor (26) includes a photo detector for sensing light from said test section (16) to provide a test signal and for sensing light from said surface adjacent said test section (16) to provide an actual signal, and a comparator for providing said heating signal in response to a predetermined differentiation between said test and actual signals for initiating said heater (18) to heat said inner surface (14).

* * * * *